(12) United States Patent
Zhang et al.

(10) Patent No.: US 10,558,288 B2
(45) Date of Patent: Feb. 11, 2020

(54) MULTI-TOUCH DISPLAY PANEL AND METHOD OF CONTROLLING THE SAME

(71) Applicant: SAMSUNG DISPLAY CO., LTD., Yongin-si, Gyeonggi-do (KR)

(72) Inventors: Yiwei Zhang, Milpitas, CA (US); Janghwan Lee, Pleasanton, CA (US); Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 85 days.

(21) Appl. No.: 15/245,080

(22) Filed: Aug. 23, 2016

(65) Prior Publication Data

US 2018/0011586 A1    Jan. 11, 2018

Related U.S. Application Data

(60) Provisional application No. 62/359,665, filed on Jul. 7, 2016.

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0412* (2013.01); *G06F 3/0488* (2013.01); *G06F 3/04842* (2013.01); *G06F 3/04845* (2013.01); *G06F 3/04883* (2013.01); *G06F 3/04886* (2013.01); *G06F 3/1454* (2013.01);
(Continued)

(58) Field of Classification Search
CPC .. G06F 3/0416; G06F 3/0412; G06F 3/04845;
G06F 3/04883; G06F 3/1454; G06F 2203/04104; G06F 2203/04808; G06F 3/04886; G06F 3/04842; G06F 3/0488; G06F 2203/0383; G06F 2203/0382
See application file for complete search history.

(56) References Cited

U.S. PATENT DOCUMENTS 8,390,577 B2    3/2013 Lemort et al.
8,847,888 B2    9/2014 Bohn
(Continued)

FOREIGN PATENT DOCUMENTS

EP    3089011 A1    11/2016
WO    WO 2015/098190 A1    7/2015

OTHER PUBLICATIONS

EPO Extended Search Report dated Dec. 6, 2017, for corresponding European Patent Application No. 17180317.4 (7 pages).
(Continued)

*Primary Examiner* — Jonathan A Boyd
(74) *Attorney, Agent, or Firm* — Lewis Roca Rothgerber Christie LLP (57) ABSTRACT

A multi-touch display panel includes: a display panel configured to display an image according to image data; a multi-touch panel arranged over the display panel and configured to generate touch data; and a communication module configured to communicate with a remote device. The remote device includes a display panel and a touch screen, and the communication module is further configured to receive the image data from the remote device and to provide the touch data to the remote device.

16 Claims, 6 Drawing Sheets

(51) Int. Cl.
*G06F 3/0484* (2013.01)
*G06F 3/14* (2006.01)

(52) U.S. Cl.
CPC ........... *G06F 2203/0382* (2013.01); *G06F 2203/0383* (2013.01); *G06F 2203/04104* (2013.01); *G06F 2203/04808* (2013.01)

(56) References Cited

U.S. PATENT DOCUMENTS

| | | |
|---|---|---|
| 8,860,686 B2 | 10/2014 | Simmons et al. |
| 8,866,771 B2 | 10/2014 | Hintermeister |
| 9,268,423 B2 | 2/2016 | Stone |
| 2010/0241966 A1 | 9/2010 | Kim et al. |
| 2011/0050640 A1 | 3/2011 | Lundback et al. |
| 2011/0119624 A1 | 5/2011 | Coldefy et al. |
| 2013/0123010 A1 | 5/2013 | Steil et al. |
| 2013/0188098 A1* | 7/2013 | Higashi ............ H04N 5/4403 348/734 |
| 2013/0222338 A1* | 8/2013 | Gim ............... G06F 3/041 345/174 |
| 2015/0067540 A1* | 3/2015 | Yang .............. H04L 12/1822 715/753 |
| 2017/0038892 A1* | 2/2017 | Ikeda .............. G03B 17/54 |

OTHER PUBLICATIONS

Rekimoto; SmartSkin: An Infrastructure for Freehand Manipulation on Interactive Surfaces; Interaction Laboratory, Sony Computer Science Laboratories, Inc., © 2001, ACM 1-58113-453-3/02/004.

\* cited by examiner

MULTI-TOUCH DISPLAY PANEL AND METHOD OF CONTROLLING THE SAME

CROSS-REFERENCE TO RELATED APPLICATION(S)

This utility patent application claims priority to and the benefit of U.S. Provisional Patent Application Ser. No. 62/359,665, filed Jul. 7, 2016, entitled "MULTI-TOUCH CONTROL SYSTEM," the entire content of which is incorporated herein by reference.

BACKGROUND

1. Field

Aspects of example embodiments of the present invention relate to a multi-touch display panel, a method of controlling a multi-touch display panel, and a multi-touch display panel operated according to a method.

2. Related Art

Various input devices exist which allow users to interact with computer systems. In early computer systems, input devices included punch cards and/or keyboards.

With the advent of computer graphical user interfaces, in which a two-dimensional graphical screen (e.g., a desktop) is presented to a user, traditional keyboards were no longer sufficient as input devices. Thereafter, computer mouse devices (e.g., computer mice or mouses) became popular input devices, allowing users to interact with and manipulate the graphical user interface of a connected computer system. Using a computer mouse, a user is able to manipulate the graphical user interface by, for example, opening, closing, and interacting with programs and moving and resizing program windows displayed on the graphical user interface.

Recently, especially in view of the popularity of mobile devices, such as smart phones and the like, touch panels (e.g., touch screens or touch screen panels) have become popular as input devices. Rather than being an external input device, such as a computer mouse, a touch panel is a screen, panel, film, or layer that is positioned over a display panel and converts a touch event, such as contact or near contact between a device, such as stylus, and/or a human finger and the touch panel, to coordinates to be interpreted as an input for a connected computer system. A combined (or coupled together) display panel and touch panel may be known as a touch display panel. Thus, touch display panels allow users to ergonomically and intuitively interact with a computer system by using, for example, their fingers.

More recently, multi-touch panels have been developed, which are able to concurrently (e.g., simultaneously) detect and interpret multiple contact point touch events (e.g., touches). Multi-touch panels increase a user's ability to interact with a connected computer system by, for example, programming the computer system to respond to certain multi-touch events (e.g., touch events in which a plurality of contact points, such as fingers, are concurrently detected) differently than how the computer system responds to single-touch events (e.g., single contact point touch events). Some multi-touch events may include, for example, resizing a displayed window, such as a picture, by using two fingers moving toward or away from each other to decrease or increase the size of the window, respectively. Some multi-touch events may be known as gestures.

Further, multi-touch display panels, that is, a combination (or coupled-together) display panel and multi-touch panel, have been recently scaled up to be large enough for multiple people to use concurrently (or simultaneously).

SUMMARY

The present disclosure is directed toward various embodiments of a multi-touch display panel, a method of controlling the multi-touch display panel, and a system including the multi-touch display panel operating according to the method.

According to an embodiment of the present invention, a multi-touch display panel includes: a display panel configured to display an image according to image data; a multi-touch panel arranged over the display panel and configured to generate touch data; a communication module configured to communicate with a remote device, and a controller connected to the multi-touch panel and the communication module. The image includes a sub-display surface, and the remote device includes a display panel and a touch screen. The communication module is configured to receive the image data for the sub-display surface from the remote device and to provide the generated touch data to the remote device. The controller is configured to pass the generated touch data to the remote device via the communication module when the generated touch data falls within the sub-display surface and to not pass the generated touch data to the remote device when the generated touch data falls outside the sub-display surface.

The communication module may be further configured to communicate with a plurality of remote devices, and at least one of the remote devices may include the display panel and the touch screen.

The image may include a plurality of sub-display surfaces, and ones of the sub-display surfaces may correspond to the received image data from ones of the remote devices.

The received image data for at least one of the sub-display surfaces may be resized to be displayed on the display panel.

A lookup table may be stored in the controller, and the lookup table may maintain data of a position of the sub-display surface in relation to the display panel.

The controller may be further configured to determine at which one of the sub-display surfaces the generated touch data is located, to generate a sub-display touch event based on a location of the generated touch data within the corresponding one of sub-display surfaces, and to pass the sub-display touch event to the remote device corresponding to the one of the sub-display surfaces via the communication module.

According to another embodiment of the present invention, a method of controlling a multi-touch display panel is provided. The multi-touch display panel includes a display panel and a multi-touch panel and is configured to communicate with a plurality of remote devices. At least one of the remote devices includes a display panel and a multi-touch panel. The method includes: receiving display data from the remote devices; displaying the received display data on the display panel of the multi-touch display panel as discrete sub-display surfaces; scanning the multi-touch panel of the multi-touch display panel for a touch event; when the touch event is detected, determining a location of the touch event with respect to the sub-display surfaces; and when the location of the touch event is within one of the sub-display surfaces, generating a sub-display touch event according to the sub-display surface and sending the sub-display touch event to the remote device corresponding to the sub-display surface.

The received display data may be displayed on the display panel of the corresponding remote device.

The generating the sub-display touch event may include: comparing the location of the touch event on the multi-touch panel of the multi-touch display panel with a position of the sub-display surface on the display panel of the multi-touch display panel; and creating a dummy touch event including location data of the touch event according to a location of the touch event on the sub-display surface.

When the touch event is at an edge of one of the sub-display surfaces, rotating or resizing a position of the sub-display surface on the multi-touch display panel according to the touch event.

When the touch event includes five contact points within the sub-display surface, moving a position of the sub-display surface on the multi-touch display panel according to the touch event.

When the touch event is within one of the sub-display surfaces and includes less than five contact points, generating the sub-display touch event and sending the sub-display touch event to the remote device.

When the touch event includes between two and four contact points, determining whether or not the touch event is a multi-touch event, and when the touch event is a multi-touch event, recreating the multi-touch event according to the sub-display surface and sending the recreated multi-touch event to the remote device corresponding to the sub-display surface.

The method may further include receiving updated display data from the remote devices; and updating the sub-display surfaces displayed on the display panel of the multi-touch display panel as discrete sub-display surfaces.

According to another embodiment of the present invention, a system includes a multi-touch display panel operating according to a method of controlling the multi-touch display panel. The multi-touch display panel includes a display panel configured to display an image according to display data; a multi-touch panel arranged over the display panel and configured to generate touch data; and a communication module configured to communicate with a remote device including a display panel and a touch screen. The communication module is further configured to provide the display data to the display panel and to provide the touch data to the remote device. The method includes: receiving display data from the remote device; displaying the received display data on the display panel of the multi-touch display panel as a sub-display surface; scanning the multi-touch panel for a touch event; when the touch event is detected, determining a location of the touch event with respect to the sub-display surface; and when the location of the touch event is within one of the sub-display surfaces, sending the touch event to the remote device via the communication module.

The communication module may be configured to communicate with a plurality of remote devices, and the displaying the received display data may include displaying received display data from each of the remote devices as discrete sub-display surfaces.

The method may further include, when the touch event is at an edge of one of sub-display surfaces, rotating or resizing the one of the sub-display surfaces according to the touch event.

The method may further include, when the touch event is within one of the sub-display surfaces and includes fewer than five contact points, sending the touch event the remote device corresponding to the one of the sub-display surfaces.

The method may further include, when the touch event is within the one of the sub-display surfaces and includes at least five contact points, moving the one of the sub-display surfaces on the display panel of the multi-touch display panel.

The method may further include, when the touch event moves from within the sub-display surface to outside the sub-display surface, generating a dummy inactivate signal configured to inactive the touch event on the remote device; and sending the dummy inactivate signal to the remote device.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more exemplary embodiments to provide a workable device.

DETAILED DESCRIPTION

The present disclosure is directed toward various example embodiments of a multi-touch display panel, a method of controlling the multi-touch display panel, and a system including the multi-touch display panel operating according to the method. In one example embodiment, a multi-touch display panel is connected to a plurality of remote devices, at least one of the remote devices including a touch screen and display device. The multi-touch display panel is configured to display a plurality of sub-display surfaces according to display data received from the remote devices. The multi-touch display panel is further configured to send touch events that occur on the multi-touch display surface to the remote devices when a user interacts with the respective sub-display surfaces on the multi-touch display panel. Accordingly, a multi-touch display panel is provided which allows for concurrent, remote control and interaction with remote devices by one or more users. In other embodiments, a method of controlling the multi-touch display panel and a system including the multi-touch display panel being controlled according to the method are provided.

Hereinafter, example embodiments will be described, in more detail, with reference to the accompanying drawings, in which like reference numbers refer to like elements throughout. The present invention, however, may be embodied in various different forms, and should not be construed as being limited to only the embodiments illustrated herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element is referred to as being "on," "connected to," or "coupled to" another element, it can be directly on, connected to, or coupled to the other element, or one or more intervening elements may be present. In addition, it will also be understood that when an element is referred to as being "between" two elements, it can be the only element between the two elements, or one or more intervening elements may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The data driver, communication module, controller, and/or any other relevant devices or components according to example embodiments of the present invention described herein may be implemented utilizing any suitable hardware, firmware (e.g., an application-specific integrated circuit), software, and/or a suitable combination of software, firmware, and hardware. For example, the various components of the data driver, the communication module, and/or the controller may be formed on one integrated circuit (IC) chip or on separate IC chips. Further, the various components of the data driver, the communication module, and/or the controller may be implemented on a flexible printed circuit film, a tape carrier package (TCP), a printed circuit board (PCB), or formed on a same substrate as the data driver, the communication module, and/or the controller. Further, the various components of the data driver, the communication module, and/or the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the example embodiments of the present invention.

Figure 1:
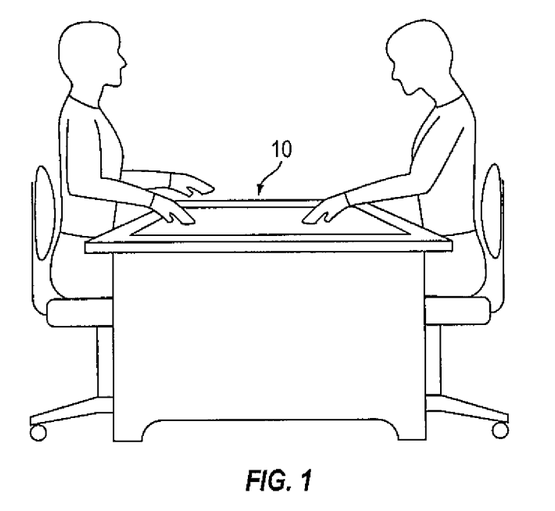
FIG. 1 shows two people using a multi-touch display panel according to an embodiment of the present invention.

FIG. 1 illustrates two people interacting with a multi-touch display panel 10 according to an embodiment of the present invention. In FIG. 1, the multi-touch display panel 10 is illustrated as being in a cabinet and facing upwards, such that users sit around the multi-touch display panel 10 to interact therewith. However, the present invention is not limited thereto, and in other embodiments, the multi-touch display panel 10 may be mounted to a wall and face parallel to a floor, such that users stand and/or sit to interact therewith.

The multi-touch display panel 10 includes a display panel that displays an image and a multi-touch panel arranged over the display panel. The multi-touch panel is configured to detect and interpret contacts (or near contacts) therewith, such as contacts by a device, for example, a stylus, or a finger. For example, the multi-touch panel is configured to detect a plurality of concurrent (or simultaneous) touches.

The multi-touch panel is arranged over the display panel and may be calibrated such that one or more users are able to contact the multi-touch panel to interact with the image displayed by the underlying display panel. For example, when the display panel displays an image including a button and a user contacts the multi-touch panel at where the button is illustrated, the multi-touch display panel 10 recognizes and interprets the user's contact with the multi-touch panel at that location with a selection of the displayed button and responds accordingly.

Figure 5:
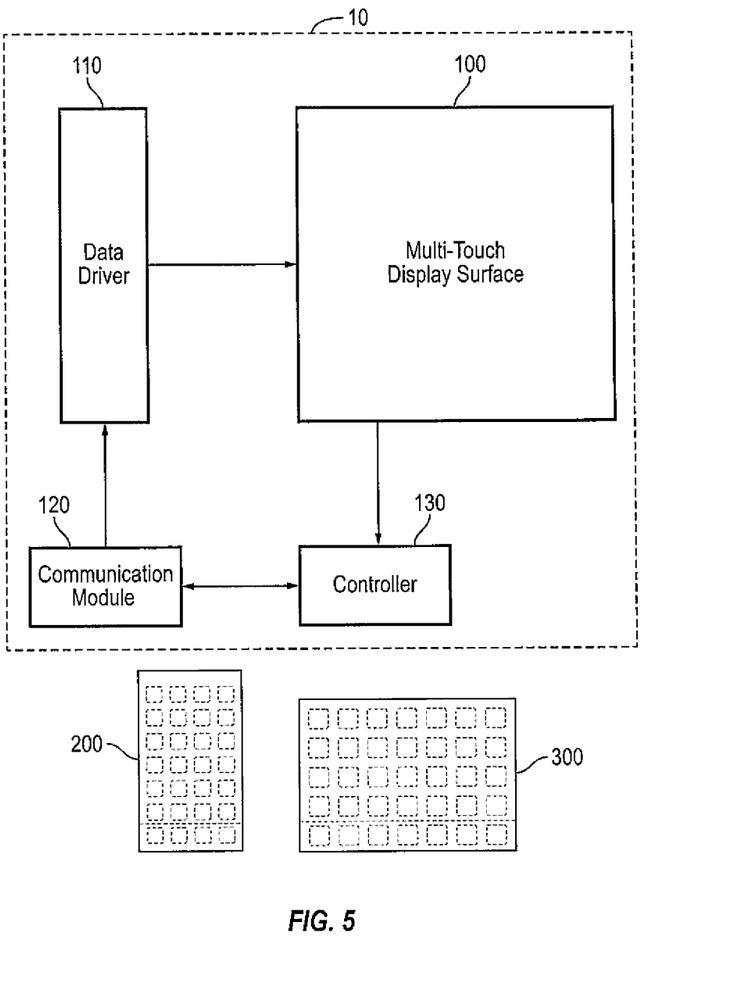
FIG. 5 is a schematic drawing of the multi-touch display panel shown in FIG. 1 according to an embodiment of the present invention.

FIG. 5 is a schematic drawing of the multi-touch display panel 10 shown in FIG. 1 according to an embodiment of the present invention. In FIG. 5, the multi-touch display panel 10 according to an embodiment of the present invention includes a multi-touch display surface 100 including the multi-touch panel over the display panel, a data driver 110 for driving the display panel of the multi-touch display surface 100, a communication module 120 for communicating with (e.g., for sending and receiving information to and from) remote devices (e.g., remote devices 200 and 300), and a controller 130 (e.g., a processor) for receiving and interpreting data from the multi-touch panel of the multi-touch display surface 100, for sending and/or receiving data to and/or from the communication module 120, and for controlling the data driver 110. Although the multi-touch display surface 100, the data driver 110, the communication module 120, and the controller 130 are illustrated as being separate components of the multi-touch display panel 10, the present invention is not limited thereto. For example, in some embodiments, the data driver 110 may be integral with the display panel of the multi-touch display surface 100, the communication module 120 may be integral with the controller 130, the controller 130 may be integral with the multi-touch panel, etc.

The communication module 120 is configured to communicate with one or more remote devices 200 and 300 (e.g., devices external to the multi-touch display panel 10), and communication between the communication module 120 and the remote devices 200 and 300 may be established in any suitable form, such as a wired connection or a wireless connection, such examples including Universal Serial Bus ("USB"), WiFi (802.11x), Bluetooth®, http connection via the Internet, etc., but the present invention is not limited to these examples.

As will be further described below, the communication module 120 may send touch events generated by the multi-touch panel and interpreted by the controller 130 to the remote devices 200, 300 to control the remote devices 200, 300 and may receive and display display information from the remote devices 200, 300 on the display panel. The remote devices 200, 300 may be devices which include displays (e.g., display devices or display screens) and touch panels. Examples of the remote devices 200, 300 include smartphones and tablet PCs. However, the present invention is not limited thereto, and in some instances, the remote devices 200, 300 may not include their own display devices and touch panels and may not include other peripheral devices, such as keyboards or mice (e.g., may be headless computer systems), such as server computer systems.

Further, the communication module 120 may pass the display information received from the remote devices 200, 300 to the controller 130 and/or to the data driver 110 to be displayed by the display panel of the multi-touch display surface 100.

Figure 2:
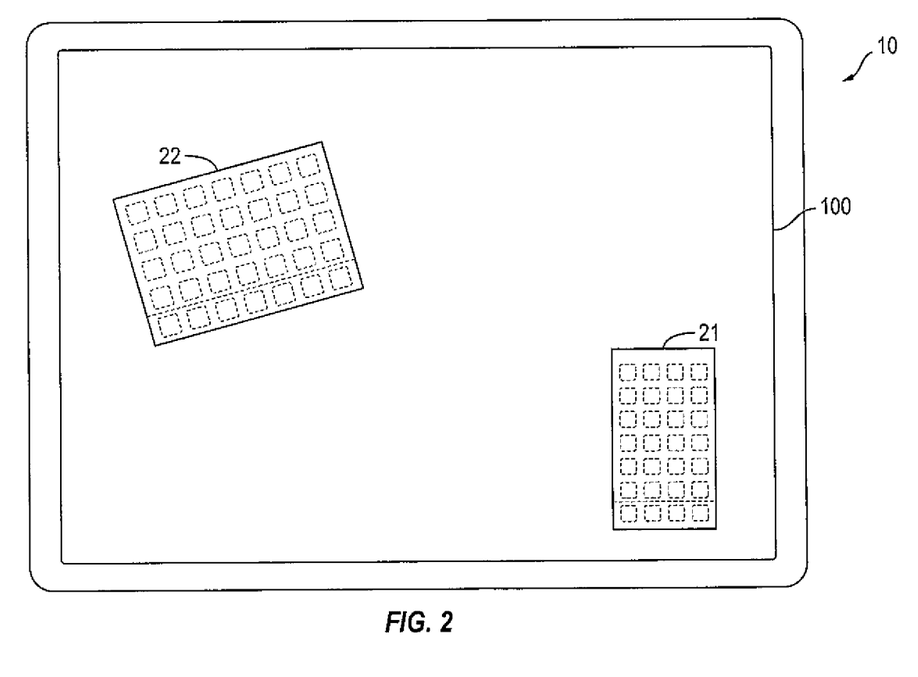
FIG. 2 shows a multi-touch display surface of the multi-touch display panel shown in FIG. 1 displaying an exemplary image.

FIG. 2 shows a multi-touch display surface of the multi-touch display panel 10 displaying an exemplary image. As illustrated in FIG. 2, the multi-touch display surface 100 displays a plurality of (e.g., two) images.

In some embodiments, the images displayed on the multi-touch display surface 100 are mirrored from the remote devices 200, 300 (e.g., are mirror images of what is displayed by the remote devices 200, 300 on their local displays) and are provided to the multi-touch display surface 100 via the communication module 120, the controller 130, and/or the data driver 110. For example, the remote device 200 may send image information or data (e.g., display information or data) to the communication module 120, which is interpreted by the controller 130 and/or the data driver 110 and is displayed on the multi-touch display surface 100. Such mirrored images from the remote devices 200, 300 may be termed a sub-display surface in this specification. In the illustrated embodiment, a first sub-display surface 21 may be a mirror image of the image displayed locally on the remote device 200, and a second sub-display surface 22 may be a mirror image of the image displayed locally on the remote device 300.

The multi-touch display surface 100 may concurrently display a plurality of sub-display surfaces, such as the first and second sub-display surfaces 21, 22. Because the multi-touch display surface 100 may be relatively large, the sub-display surfaces 21, 22 may each be smaller than the multi-touch display surface 100. For example, when one of the sub-display surfaces is a smartphone screen, that sub-display surface, when mirrored in its native resolution, will be smaller than the multi-touch display surface 100. In some cases, the mirrored image may be resized, for example, scaled up or scaled down, due to, for example, the desires of the user and/or for enhanced readability.

Users are able to interact with the sub-display surfaces 21, 22 on the multi-touch display surface 100 as though they were interacting directly with the remote devices 200, 300. For example, when a user touches an icon on, for example, the first sub-display surface 21, the controller 130 detects the touch, generates a corresponding sub-display touch event, and passes the touch event to the communication module 120. Then, the communication module 120 passes the sub-display touch event to the corresponding remote device 200. The remote device 200 may then interpret the received sub-display touch event as if the user touched the touch panel of the remote device 200 directly (e.g., a software driver may interpret the received touch event as if the user had contacted the local touch screen of the remote device 200), and the remote device 200 may respond accordingly, for example, by opening a selected application. Then, updated image information from the remote device 200 (e.g., image information including the now-open application) may be sent by the remote device 200 to communication module 120, and the controller 130 and/or the data driver 110 interprets the received updated image information and updates the first sub-display surface 21 on the multi-touch display surface 100 to display the application open on (e.g., running on) the remote device 200.

Figure 4:
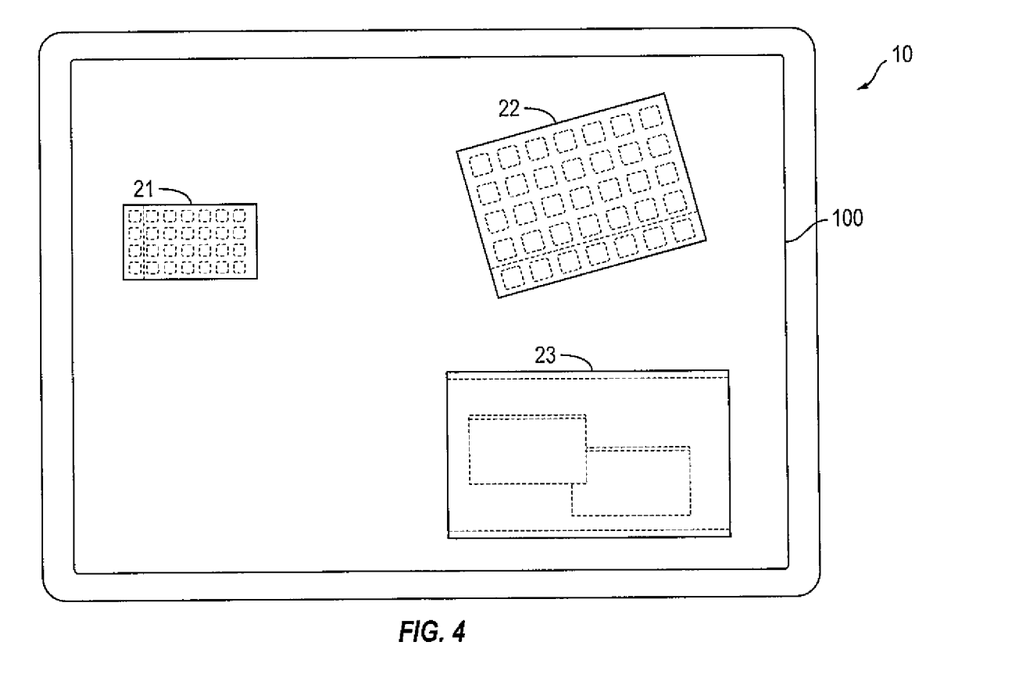
FIG. 4 shows the multi-touch display surface shown in FIG. 2 displaying another exemplary image.

The same or substantially the same features described above with respect to the first sub-display surface 21 and the remote device 200 apply to the other sub-display surfaces and remote devices. For example, the same user or another user is able to interact with (e.g., is able to concurrently interact with) the second sub-display surface 22 and, thereby, with the remote device 300 by using the multi-touch display panel 10. In addition, any number of sub-display surfaces, each mirroring an image from a remote device, may be displayed on the multi-touch display surface 100 of the multi-touch display panel 10. For example, as shown in FIG. 4, the multi-touch display surface 100 displays the first sub-display surface 21, the second sub-display surface 22, and a third sub-display surface 23. The third sub-display surface 23 may be connected to a remote device, such as a server or other headless computer system.

In addition to passing the sub-display touch events generated by the multi-touch display panel 10 to the connected remote devices 200, 300 to control the remote devices 200, 300, the multi-touch display panel 10 detects certain touch events that control (e.g., only control) the multi-touch display surface 100 (e.g., control the sub-display surfaces 21, 22 themselves). For example, in some embodiments, when a user touches an edge of one of the sub-display surfaces 21, 22, the multi-touch display panel 10, according to the touch event, resizes the corresponding sub-display surface 21, 22. For example, when a user touches the multi-touch display surface 100 at an edge of the first sub-display surface 21 (e.g., when the user touches the an area of the multi-touch display surface 100 near where the first sub-display surface 21 ends) and then moves (or drags) the touch point away from the first sub-display surface 21, the size of the first sub-display surface 21 is increased in the direction of the movement. Conversely, when the touch point is moved toward or into the first sub-display surface 21, the size of the first sub-display surface 21 is decreased in the direction of the movement. In these cases, the multi-touch display panel 10 may not pass any touch information to the remote device 200 (e.g., may not generate a corresponding sub-display touch event) but resizes the first sub-surface display 21 on the multi-touch display surface 100 according to the touch event. When resizing a sub-display surface, the multi-touch display panel 10, in some embodiments, maintains the aspect ratio of the sub-display surface (and of the corresponding remote device); however, the present invention is not limited thereto, and in other embodiments, the sub-display surfaces may be resized to have different aspect ratios than the corresponding remote devices.

Because the user touched at the edge of the first sub-display surface 21, the multi-touch display panel 10 interprets that the user desires to change the size of the first sub-surface display 21 on the multi-touch display surface 100 according to the touch event. For example, FIG. 3 illustrates the multi-touch display surface 100 in which the first sub-display surface 21 has been resized to be larger than in FIG. 2.

Figure 3:
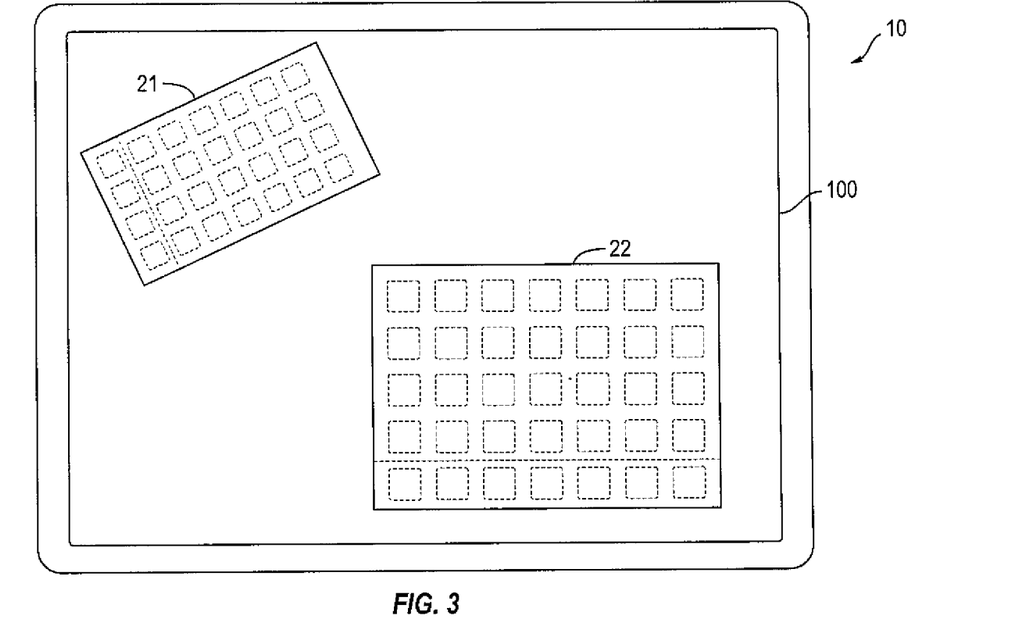
FIG. 3 shows the multi-touch display surface shown in FIG. 2 displaying another exemplary image.

As is also shown in FIG. 3, when compared to FIG. 2, the first and second sub-display surfaces 21 and 22 are moved (e.g., repositioned) on the multi-touch display surface, and the first and second sub-display surfaces 21 and 22 are reoriented (in addition to being resized, as discussed above) on the multi-touch display surface 100. To reorient (or rotate) a sub-display surface, a user may concurrently touch two different edges of the sub-display surface and may rotate the touch points in a roughly circular motion (e.g., the user may, using two figures of a hand, touch two different edges of the sub-display surface and may then rotate the hand to rotate or reorient the sub-display surface). In this case, the multi-touch display panel 10 may not pass the touch event to the corresponding remote device.

To move a sub-display surface, a user may place five fingers inside the sub-display surface (e.g., inside the edges of the sub-display surface) and then move the five fingers in the direction which the user desires to move the sub-display surface. For example, when the multi-touch display panel 10 detects a certain number of contact points (e.g., five contact points or touches) within one sub-display surface, the multi-touch display panel may not pass the touch event to the corresponding remote device but interprets and moves the corresponding sub-display surface on the multi-touch display surface 100.

In addition, the above-described example contact routines or gestures may be combined together (e.g., may be performed concurrently or simultaneously). For example, when a user places two fingers on opposite edges of a sub-display surface and both brings the fingers together and rotates the fingers in a circular motion, the corresponding sub-display surface may be both resized (e.g., reduced in size) and rotated or reoriented.

Hereinafter, example embodiments of a method of controlling a multi-touch display panel, such as that described above, will be described.

Figure 6:
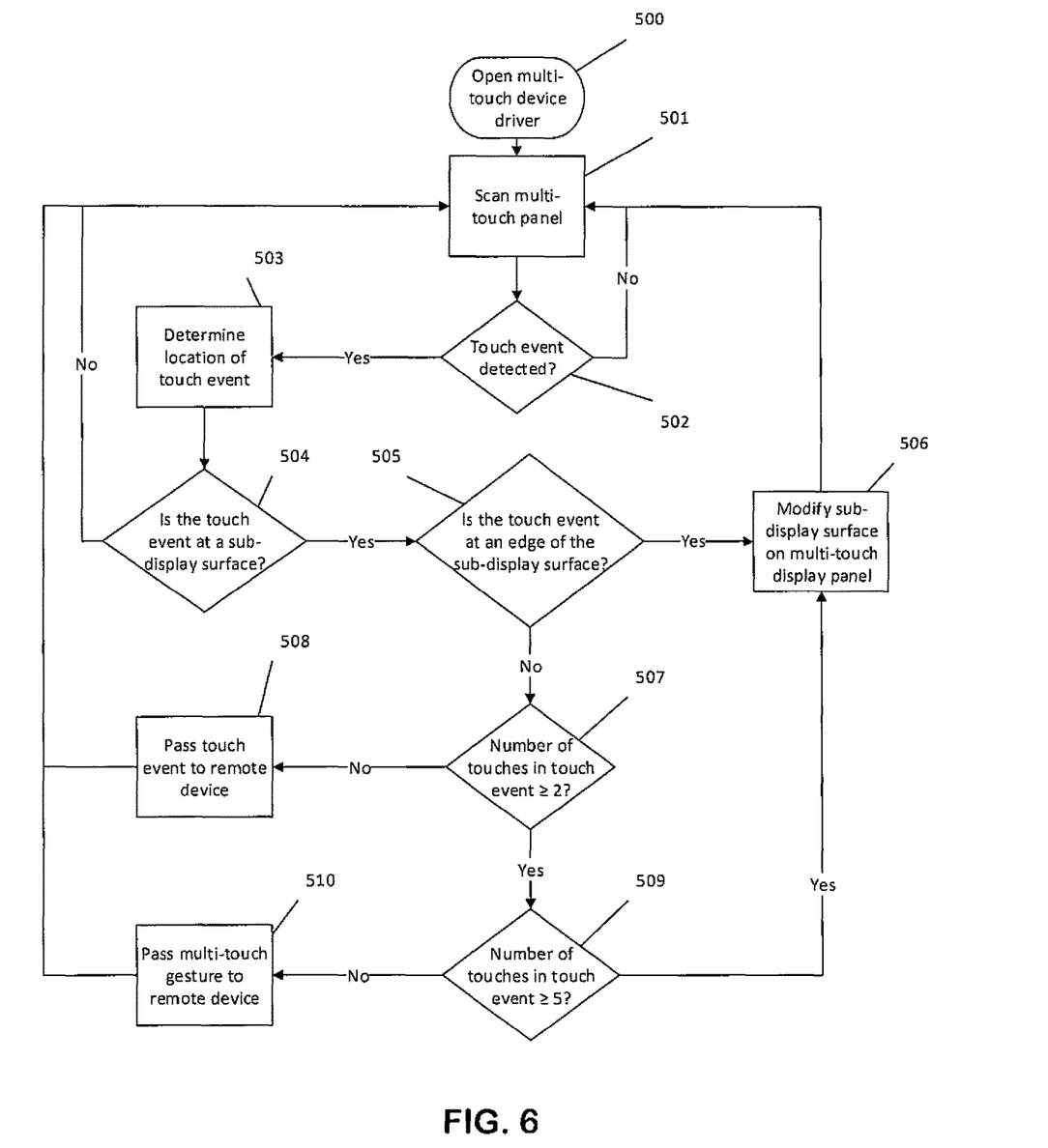
FIG. 6 is a flowchart illustrating a method of controlling a multi-touch display panel according to an embodiment of the present invention.

FIG. 6 is a flowchart illustrating a method of controlling a multi-touch display panel, such as the multi-touch display panel 10 described above, according to an embodiment of the present invention.

First, a multi-touch device driver begins running on the multi-touch display panel 10 (e.g., running on the multi-touch display surface 100 and/or the controller 130) (operation 500). Operation 500 may occur when the multi-touch display panel 10 is first started (e.g., turned on) and may occur automatically based on the programming of the multi-touch display panel 10. The multi-touch device driver may be Linux-based driver, but the present invention is not limited thereto.

Next, the multi-touch display panel 10 (e.g., the multi-touch display surface 100) may be scanned (operation 501) to determine whether or not a touch event is detected on the multi-touch display surface 100. When a touch event (e.g., a touch) is detected (operation 502), the multi-touch display panel 10 will then determine the location of the touch event (operation 503). When a touch event is not detected (operation 502), the multi-touch display panel 10 will be scanned again (operation 501). The scanning of the multi-touch display panel 10 (operation 501) may be repeated (e.g., repeated at regular intervals) until a touch is detected and the method proceeds to operation 502.

After determining the location of the touch event (operation 503), the multi-touch display panel 10 determines whether or not the touch event is at a sub-display surface (operation 504). One example method of determining whether or not the touch event is at a sub-display surface is to maintain a lookup table, for example, in the controller 130, in which coordinates (e.g., boundary coordinates) of each of the sub-display surfaces are maintained. The coordinates may be, for example, (x,y) coordinates relative to the multi-touch display surface 100, but the present invention is not limited thereto. In some embodiments, the lookup table may maintain a listing of each of the (x,y) coordinates on the multi-touch display surface, with the (x,y) coordinates at where a sub-display surface is currently displayed being indicated in the lookup table.

At operation 504, according to some embodiments, the controller 130 compares the (x,y) coordinates of the touch event with the lookup table. When the touch event is located at (e.g., within or outside of but near to) (e.g., is determined to be located at) one of the sub-display surfaces, the method proceeds to operation 505. When the touch event is located outside of (e.g., outside of and not near to) any of the sub-display surfaces, the process returns to operation 501 and the multi-touch display panel 10 is rescanned for touch events. However, in some embodiments, the multi-touch display panel 10 may include a locally run program displayed on the multi-touch display surface 100 behind and/or adjacent to the sub-display surfaces. In these embodiments, when the touch event is located outside of any of the sub-display surfaces, the multi-touch display panel 10 may then determine whether or not the touch event location corresponds to a locally run program being displayed on the multi-touch display surface 100 and may respond accordingly.

At operation 505, the multi-touch display panel 10 determines whether or not the touch event is at an edge of the sub-display surface. As used herein, "at an edge" refers to being near to (either inside or outside of) a border portion of the sub-display surface. The area considered to be near to the border portion of the sub-display surface may be modified, for example, depending on user preference. For example, a certain number of (x,y) coordinates on either side of the border of the sub-display surface may be considered to be near to the border of the sub-display surface. Also, as the size of the sub-display surface increases, the number of (x,y) coordinates adjacent to the border of the sub-display surface may be reduced, and vice versa. In some embodiments, the number of (x,y) coordinates considered to be at the edge of the sub-display surface may be determined such that a user may easily touch the edge of the sub-display surface to modify the sub-display surface (operation 506, discussed below). If the edge of the sub-display surface is too small, a user may not be able to easily select (e.g., touch) the edge portion, and touch events the user intends to modify the sub-display surface may be interpreted differently by the multi-touch display panel, to the frustration of the user.

When the multi-touch display panel 10 determines that the touch event is at the edge of the sub-display surface, than the touch event is handled locally. For example, when the touch event is at the edge of the sub-display surface, the multi-touch display panel 10 does not pass or send the touch event to a remote device (e.g., does not generate a corresponding sub-display touch event) corresponding to the sub-display surface but instead processes the touch event locally (e.g., in the controller 130 and/or the data driver 110). When the touch event is at the edge of the sub-display surface, the multi-touch display panel 10 modifies the sub-display surface. For example, depending on the touch event, the sub-display surface may be resized and/or rotated, as described above. In these instances, the lookup table in the controller 130 may be updated as the sub-display surface is resized and/or rotated.

When the multi-touch display panel determines 10 that the touch event is not at the edge of the sub-display surface, the multi-touch display panel then determines whether or not the touch event is a multi-touch event (operation 507), that is, when the number of contact points in the touch event is greater than or equal to two. When the touch event is not a multi-touch event, that is, when the number of touches in the touch event is less than two, the multi-touch display panel 10 proceeds to operation 508 and passes (or sends) the touch event (e.g., generates and sends the sub-display touch event) to the remote device corresponding to the sub-display surface.

At operation 508, the multi-touch display panel 10 may recalculate the location of the touch event based on the (x,y) coordinates of the sub-display surface on the multi-touch display surface 100. For example, the touch event may be analyzed according to its position (e.g., its absolution position) on the multi-touch display surface 100. However, to accurately pass the touch event to the remote device, the location of the touch event is recalculated according to the sub-display surface (x,y) coordinates. This may be accomplished in the controller 130 by, for example, using calculation tables to convert the touch event's absolute location to its corresponding sub-display surface location. Then, this recreated touch event including the sub-display surface location (e.g., the sub-display touch event) is passed to the remote device by using the communication module 120. Accordingly, the remote device receives the recreated touch event and analyzes it just as it would analyze a local touch event on the touch screen of the remote device. For example, the remote device does not need to further process the received recreated touch event because the recalculation of the touch event was completed by the multi-touch display panel 10.

When the multi-touch display panel 10 determines that the touch event is a multi-touch event (operation 507), that is, that the number of touches in the touch event is greater than or equal to two, the process continues to operation 509.

At operation 509, the multi-touch display panel 10 determines whether or not the number of touches in the touch event is greater than or equal to five. When the number of touches in the touch event is greater than or equal to five, the multi-touch display panel 10 analyzes the touch event locally (operation 506). That is, the touch event is not passed to the remote device. In some embodiments, in response to a five-contact-point touch event, the multi-touch display panel 10 moves the sub-display surface on the multi-touch display surface 100. For example, when a user desires to move a sub-display surface to a different location on the multi-touch display surface 100, the user may place five fingers in or near the sub-display surface to move the sub-display surface.

The present invention is not limited to the number of touches being five to move the sub-display surface. In other embodiments, the sub-display surface may be moved in response to any number of touches in a touch event, such as three or four. Also, in some embodiments, as discussed above, moving, resizing, and/or rotating the sub-display surface on the multi-touch display surface may be handled concurrently (or simultaneously). For example, when a user places five fingers in or near a sub-display surface and moves and rotates the five fingers, the sub-display surface may be both moved and rotated in response thereto.

When the multi-touch display panel 10 determines that the number of touches in the touch event is less than five, the multi-touch display panel 10 passes the multi-touch event (e.g., the multi-touch gesture) to the remote device (operation 510). Similar to operation 508 described above, at operation 510 the multi-touch display panel may recalculate the multi-touch event to the corresponding sub-display surface and respective remote device (e.g., may generate a multi-touch sub-display touch event).

After passing the multi-touch event to the remote device (operation 510) or moving the sub-display surface (operation 506), the process returns to operation 501 and the multi-touch display panel 10 is rescanned for a next touch event. This process may repeat as long as the multi-touch display panel 10 remains turned on.

In addition, throughout the above-described process, the communication module 120 may be receiving display data from each of the remote devices to update the image(s) displayed on the multi-touch display surface 100. In some embodiments, the communication module 120 may receive display data only after a touch event is passed to the remote device.

Figure 7:
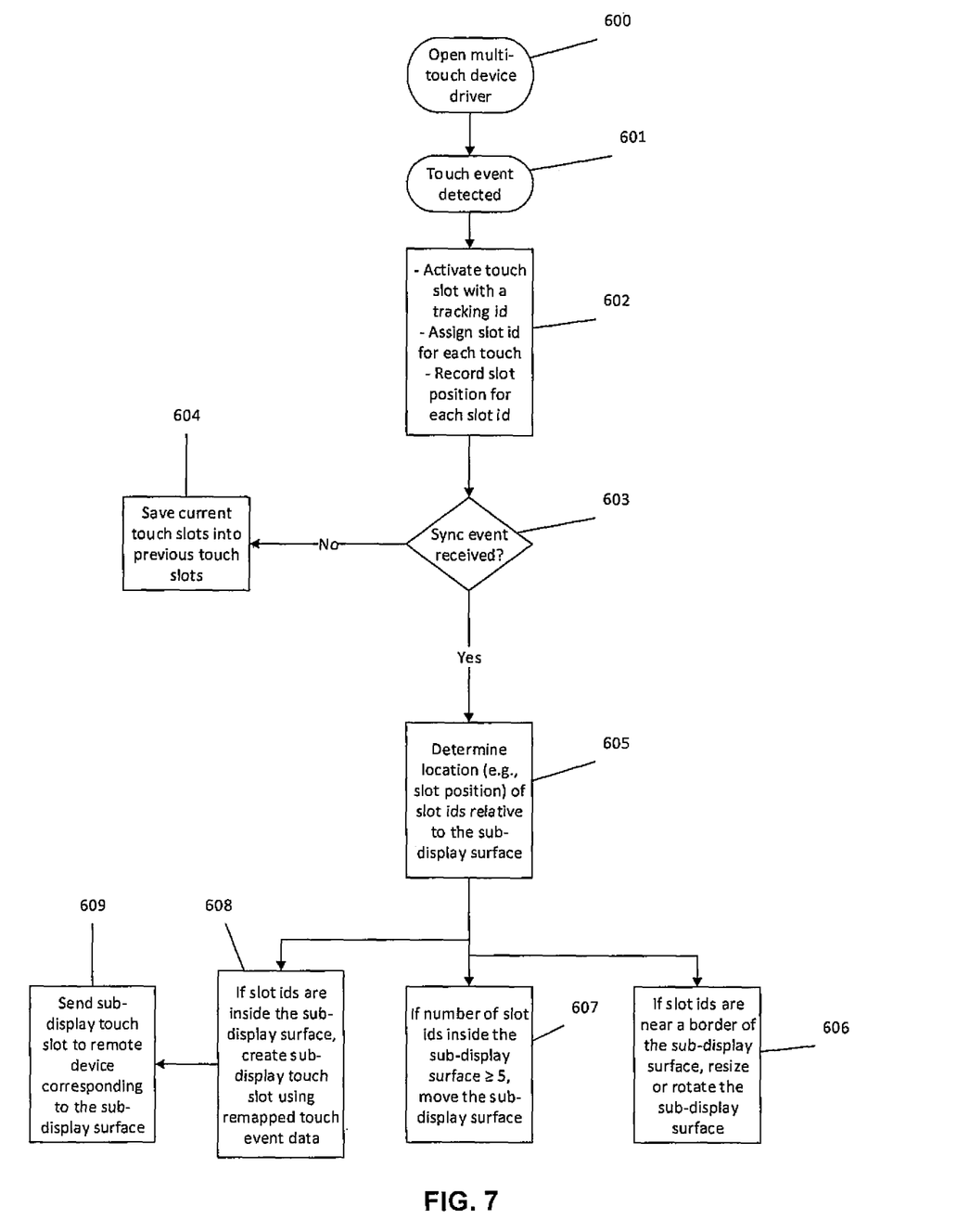
FIG. 7 is a flowchart illustrating a method of controlling a multi-touch display panel according to another embodiment of the present invention.

FIG. 7 is a flowchart illustrating a method of controlling a multi-touch display panel, such as the multi-touch display panel 10, according to another embodiment of the present invention.

Starting at operation 600, the multi-touch display panel 10 opens a multi-touch device driver. Operation 600 may occur upon starting the multi-touch display panel 10. For example, operation 600 may occur without any user input. In some embodiments, the multi-touch device driver may be a Linux-based driver. However, the present invention is not limited thereto.

The multi-touch device driver may repeatedly scan the multi-touch display surface 100 to detect a touch event (e.g., a touch). When a touch event is detected (operation 601), a touch slot is activated in the multi-touch display panel 10 (e.g., in the controller 130) by using a tracking id (operation 602). The touch slot may include a slot id (or multi-touch id), which indicates a number of contact points in the touch event, and one or more slot positions, which indicate the positions of the contact points on the multi-touch display surface 100.

Therefore, in an example in which a user touches the multi-touch display surface 100 with two fingers, a touch slot 0 may be activated by a tracking id, and the slot id of the touch slot 0 may be 2. Each of the slot positions may be the (x,y) coordinates of a respective contact location (e.g., of a respective slot id) on the multi-touch display surface 100.

Then, when a sync event is received (operation 603), the multi-touch display panel 10 (e.g., the controller 130) recognizes that a touch event is completed and is ready to be acted upon. However, in this case, a touch event being completed merely indicates some contact with the multi-touch display surface 100 and does not indicate that a user has removed contact with the multi-touch display surface 100. Thus, for example, movement of one or more contact points or non-movement of one or more contact points for a certain amount of time may indicate a completed touch event which the multi-touch display panel 10 will act upon.

When a sync event is not received (operation 604), the current touch slots are saved (e.g., are saved in the controller 130) and the process returns to await another touch event. Any subsequent touch events will be assigned a touch slot greater than the saved touch slot.

When the sync event is received (operation 605), the location of the touch slot (e.g., the slot positions) is determined relative to the location of the sub-display surfaces on the multi-touch display surface 100. For example, the controller 130 may maintain a lookup table storing information (e.g., (x,y) coordinates) of where each of the sub-display surfaces are located on the multi-touch display surface 100. The controller 130 may compare the slot positions to the positions of the sub-display surfaces on the multi-touch display surface 100.

When the slot ids of a touch slot are near (e.g., on or adjacent to) a border of one of the sub-display surfaces (operation 606), the controller 130 may interpret the touch slot locally (e.g., may not send the touch slot to a remote device) and may, in response to the touch slot, resize or rotate the sub-display surface on the multi-touch display surface 100, as described above.

When a number of the slot ids having slot positions inside one of the sub-display surfaces is greater than or equal to five (operation 607), the controller 130 may interpret the touch slot locally and may, in response to the touch slot, move the sub-display surface on the multi-touch display surface 100, as described above.

When the number of slot ids having slot positions in one of the sub-display surfaces is less than five (operation 608), a sub-display touch slot (e.g., a dummy touch slot) is created by the controller 130. As will be further described below with reference to FIG. 8, at operation 608, the sub-display touch slot is created by remapping the slot positions from the touch slot falling within the sub-display surface. Because the sub-display surface may not take up (e.g., may be smaller than) the entire multi-touch display surface 100, a slot position on the sub-display surface (e.g., (x,y) coordinates of a touch position on the sub-display surface) may be different than the slot position on the multi-touch display surface 100 (e.g., (x,y) coordinates of a touch position on the multi-touch display surface 100). Accordingly, the controller 130 may remap the slot positions of the touch slot according to the touch slot relative to the sub-display surface to generate the sub-display touch slot. Further, when a remote device corresponding to the sub-display surface is displaying an image at a different resolution than the sub-display surface is being displayed on the multi-touch display surface 100, the controller 130 may also remap the touch slot according to the difference in resolution.

Then, the controller 130, via the communication module 120, sends the sub-display touch slot to the remote device corresponding to the sub-display surface. The remote device receives the sub-display touch slot and interprets it locally as it would interpret a touch on the local touch screen. For example, the remote device may not have to process or interpret the sub-display touch slot any more than it would have to process or interpret a local touch event, thus allowing for ease of use of different remote devices with the multi-touch display panel 10.

Figure 8:
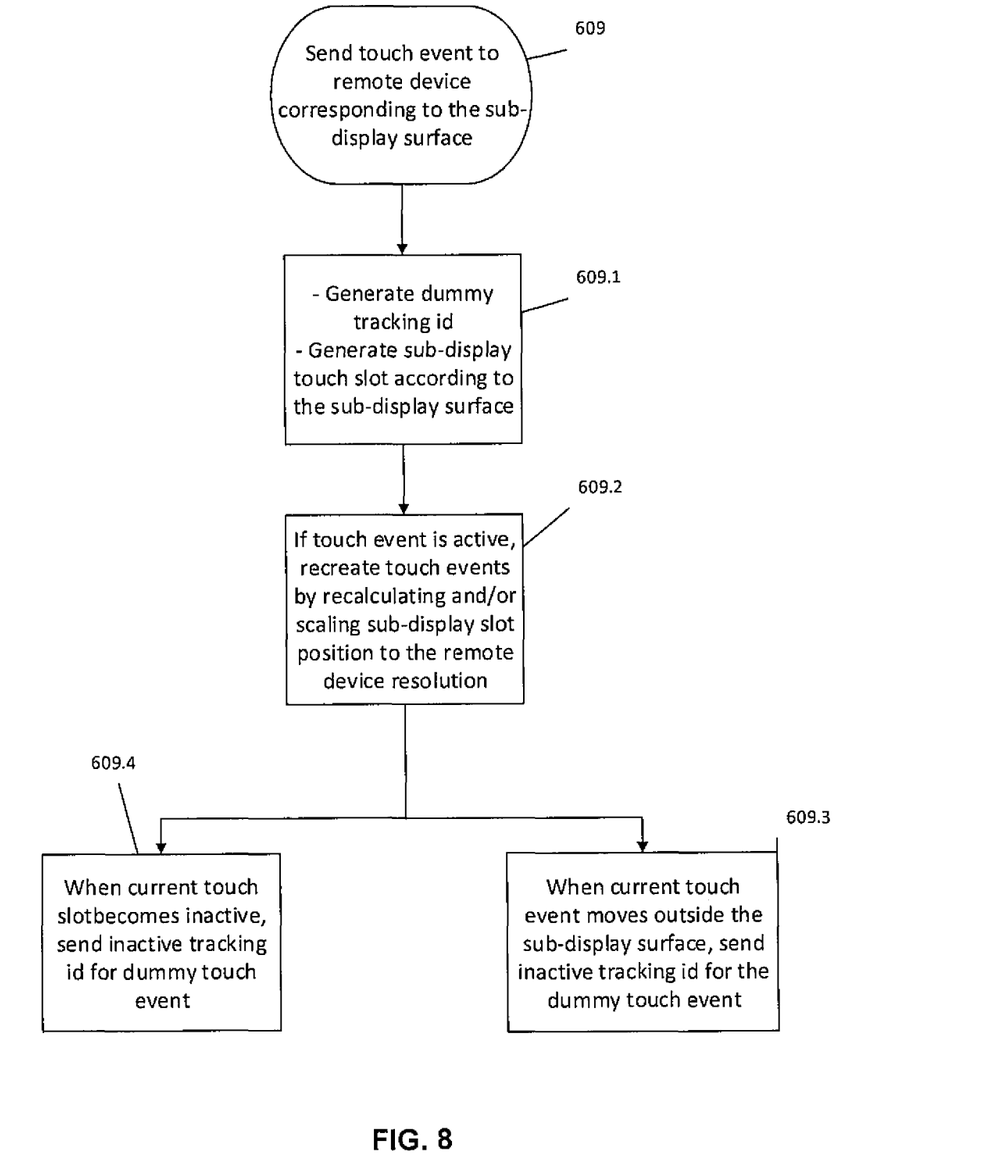
FIG. 8 is a flowchart illustrating a subroutine of the method illustrated in FIG. 7.

FIG. 8 is a flowchart further illustrating the operation 609 of the method illustrated in FIG. 7. As described above, at operation 609, the multi-touch display panel 10 sends the touch event to the remote device corresponding to the contacted sub-display surface on the multi-touch display surface 100.

At operation 609.1, the multi-touch display panel 10 (e.g., the controller 130) generates a dummy tracking id for the remote device corresponding to the contacted sub-display surface. Then, the multi-touch display panel 10 recreates the touch slot according to the sub-display surface and the remote device (e.g., generates the sub-display touch slots). For example, as described above, the sub-display touch slot corresponding to the dummy tracking id is adjusted for the size and rotation of the sub-display surface on the multi-touch display surface 100. For example, the sub-display touch slot will have (x,y) coordinates based on the sub-display surface (e.g., based on the contact point within the sub-display surface) rather than (x,y) coordinates based on the multi-touch display surface 100 (e.g., based on the contact point within the multi-touch display surface 100). Similarly, when the sub-display surface is displayed at a different resolution than runs natively on the corresponding remote device, the sub-display touch slot will be adjusted accordingly.

At operation 609.2, when the touch event is active, for example, when additional touch events are occurring (e.g., are being created by the multi-touch display panel 10) within the sub-display surface, the multi-touch display panel 10 continues to create additional sub-display touch slots within the dummy tracking id and sends the sub-display touch slots to the corresponding remote device. Accordingly, there is reduced or minimal lag between the touch event on the multi-touch display surface 100 and the response by the corresponding remote device.

When the contact point (e.g., the current touch event) moves outside the sub-display surface (operation 609.3) (e.g., when the user moves drags the contact point from within the sub-display surface to outside the sub-display surface), then the multi-touch display panel 10 sends an inactivate tracking id corresponding to the dummy tracking id to the remote device. That is, even though the touch event does not end on the multi-touch display surface 100, the multi-touch display panel 10 creates and sends the inactive tracking id to the remote device to inactive the dummy tracking id and end the touch event on the remote device.

When the contact point (e.g., the current touch event) becomes inactive (operation 609.4) (e.g., when the contact point is removed from the multi-touch display surface 100), the multi-touch display panel 10 generates and sends the inactive tracking id to the remote device to inactive the dummy tracking id and end the touch event on the remote device.

Although the present invention has been described with reference to the example embodiments, those skilled in the art will recognize that various changes and modifications to the described embodiments may be performed, all without departing from the spirit and scope of the present invention. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

What is claimed is:

1. A method of controlling a multi-touch display panel, the multi-touch display panel comprising a display panel and a multi-touch panel and being configured to communicate with a plurality of remote devices, at least one of the remote devices comprising a display panel and a multi-touch panel, the method comprising:
receiving display data from the remote devices;
displaying the received display data on the display panel of the multi-touch display panel as discrete sub-display surfaces;
scanning the multi-touch panel of the multi-touch display panel for a touch event;
when the touch event is detected, determining a location of the touch event with respect to the sub-display surfaces;
when the location of the touch event is within one of the sub-display surfaces, generating a sub-display touch event according to the sub-display surface and sending the sub-display touch event to the remote device corresponding to the sub-display surface; and
when the touch event moves from within the sub-display surface to outside the sub-display surface, generating a dummy inactivate signal configured to inactivate the touch event on the remote device and sending the dummy inactivate signal to the remote device.

2. The method of claim 1, wherein the received display data is displayed on the display panel of the corresponding remote device.

3. The method of claim 1, wherein, when the touch event is at an edge of one of the sub-display surfaces, rotating or resizing a position of the sub-display surface on the multi-touch display panel according to the touch event.

4. The method of claim 1, wherein, when the touch event comprises five contact points within the sub-display surface, moving a position of the sub-display surface on the multi-touch display panel according to the touch event.

5. The method of claim 1, wherein, when the touch event is within one of the sub-display surfaces and comprises less than five contact points, generating the sub-display touch event and sending the sub-display touch event to the remote device.

6. The method of claim 5, wherein, when the touch event comprises between two and four contact points, determining whether or not the touch event is a multi-touch event, and
wherein, when the touch event is a multi-touch event, recreating the multi-touch event according to the sub-display surface and sending the recreated multi-touch event to the remote device corresponding to the sub-display surface.

7. The method of claim 1, further comprising receiving updated display data from the remote devices; and
updating the sub-display surfaces displayed on the display panel of the multi-touch display panel as discrete sub-display surfaces.

8. A system comprising a multi-touch display panel operating according to a method of controlling the multi-touch display panel, the multi-touch display panel comprising a display panel configured to display an image according to display data; a multi-touch panel arranged over the display panel and configured to generate touch data; and a communication module configured to communicate with a remote device comprising a display panel and a touch screen, the communication module being further configured to provide the display data to the display panel and to provide the touch data to the remote device, the method comprising:
receiving display data from the remote device;
displaying the received display data on the display panel of the multi-touch display panel as a sub-display surface;
scanning the multi-touch panel for a touch event;
when the touch event is detected, determining a location of the touch event with respect to the sub-display surface;
when the location of the touch event is within one of the sub-display surfaces, sending the touch event to the remote device via the communication module; and
when the touch event moves from within the sub-display surface to outside the sub-display surface, generating a dummy inactivate signal configured to inactivate the touch event on the remote device; and sending the dummy inactivate signal to the remote device.

9. The system of claim 8, wherein the communication module is configured to communicate with a plurality of remote devices, and
wherein the displaying the received display data comprises displaying received display data from each of the remote devices as discrete sub-display surfaces.

10. The system of claim 9, wherein the method further comprises, when the touch event is at an edge of one of sub-display surfaces, rotating or resizing the one of the sub-display surfaces according to the touch event.

11. The system of claim 10, wherein the method further comprises, when the touch event is within one of the sub-display surfaces and comprises fewer than five contact points, sending the touch event the remote device corresponding to the one of the sub-display surfaces.

12. The system of claim 11, wherein the method further comprises, when the touch event is within the one of the sub-display surfaces and comprises at least five contact points, moving the one of the sub-display surfaces on the display panel of the multi-touch display panel.

13. A multi-touch display panel comprising:
- a display panel configured to display an image according to image data, the image comprising a plurality of sub-display surfaces;
- a multi-touch panel arranged over the display panel and configured to generate touch data based on a touch event;
- a communication module configured to communicate with a plurality of remote devices, each of the remote devices comprising a display panel and a touch screen, the communication module being configured to receive the image data for the sub-display surfaces from the remote devices and to provide the generated touch data to the remote devices; and
- a controller connected to the multi-touch panel and the communication module, the controller being configured to determine a location of the touch event with respect to the sub-display surfaces and, when the location of the touch event is within one of the sub-display surfaces, to generate a sub-display touch event according to the sub-display surface and to send the sub-display touch event to the remote device corresponding to the sub-display surface while each of the discrete sub-display surfaces are concurrently displayed on the display panel, wherein, when the touch event moves from within the sub-display surface to outside the sub-display surface, the controller is configured to generate a dummy inactivate signal to inactivate the touch event on the remote device and is configured to send the dummy inactivate signal to the remote device.

14. The multi-touch display panel of claim 13, wherein the received display data is displayed on the display panel of the corresponding remote device.

15. The multi-touch display panel of claim 13, wherein the controller is configured to:
- compare the location of the touch event on the multi-touch panel of the multi-touch display panel with a position of the sub-display surface on the display panel of the multi-touch display panel; and
- create a dummy touch event comprising location data of the touch event according to a location of the touch event on the sub-display surface.

16. The multi-touch display panel of claim 13, wherein, when the touch event is at an edge of one of the sub-display surfaces, a position of the sub-display surface is rotated or resized on the multi-touch display panel according to the touch event.

\* \* \* \* \*